US006470174B1

(12) United States Patent
Schefte et al.

(10) Patent No.: US 6,470,174 B1

(45) Date of Patent: Oct. 22, 2002

(54) RADIO UNIT CASING INCLUDING A HIGH-GAIN ANTENNA

(75) Inventors: Henry Schefte, deceased, late of Skärholmen (SE), by Ann-Margret Schefte, heir; Sven Anders Gösta Derneryd, Hisings Backa (SE); Jan Staffan Reinefjord, Djursholm (SE)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/163,820

(22) Filed: Sep. 30, 1998

(30) Foreign Application Priority Data

Oct. 1, 1997 (SE) ............................................. 9703584

(51) Int. Cl.[7] ............................. H04B 1/38; H01Q 1/24

(52) U.S. Cl. .......................... 455/90; 343/702; 455/562

(58) Field of Search ................................ 455/550, 575, 455/90, 562, 82, 83, 81, 13.3; 343/702, 700 MS, 718

(56) References Cited

U.S. PATENT DOCUMENTS

| | | | | |
|---|---|---|---|---|
| 4,783,661 A | | 11/1988 | Smith | 343/700 |
| 4,792,808 A | * | 12/1988 | Hildebrand | 343/853 |
| 4,827,271 A | | 5/1989 | Berneking et al. | 343/700 |
| 5,003,318 A | | 3/1991 | Berneking et al. | 343/700 |
| 5,043,738 A | | 8/1991 | Shapiro et al. | 343/700 |
| 5,153,600 A | | 10/1992 | Metzler et al. | 343/700 |
| 5,187,490 A | * | 2/1993 | Ohta et al. | 343/700 MS |
| 5,231,407 A | | 7/1993 | McGirr et al. | 343/700 |
| 5,270,721 A | * | 12/1993 | Tsukamoto et al. | 343/700 MS |
| 5,355,139 A | * | 10/1994 | Hirata et al. | 342/371 |
| 5,561,434 A | | 10/1996 | Yamazaki | 343/700 |
| 5,606,733 A | * | 2/1997 | Kanayama et al. | 455/273 |
| 5,613,224 A | | 3/1997 | Auvray | 455/575 |
| 5,650,788 A | | 7/1997 | Jha | 343/700 |
| 5,805,067 A | * | 9/1998 | Bradley et al. | 455/90 X |
| 6,104,349 A | * | 8/2000 | Cohen | 343/702 |

FOREIGN PATENT DOCUMENTS

| | | | |
|---|---|---|---|
| AU | 9475806 | A1 | 5/1995 |
| AU | 9527117 | A1 | 2/1996 |
| EP | 0649227 | A1 | 4/1995 |
| EP | 0696 112 | A2 | 2/1996 |
| EP | 0752735 | | 1/1997 |
| EP | 0753897 | A2 | 1/1997 |
| FR | 2673496 | | 9/1992 |
| GB | 2293277 | A | 3/1996 |
| JP | 56-168437 | | 12/1981 |
| JP | 1-321738 | | 12/1989 |
| JP | 2-48829 | | 2/1990 |
| JP | 4-40003 | | 2/1992 |
| JP | 4-252523 | | 9/1992 |
| JP | 6-224622 | | 8/1994 |
| JP | 07060777 | | 3/1995 |
| JP | 07321548 | A | 12/1995 |
| JP | 08213835 | A | 8/1996 |
| WO | WO 95/04386 | | 2/1995 |
| WO | WO 96/10276 | | 4/1996 |

OTHER PUBLICATIONS

Bengstson, R.; International–Type Search Report; Search Request No. SE 97/01179; May 27, 1998; pp. 1–4.

* cited by examiner

*Primary Examiner*—Tracy Legree
(74) *Attorney, Agent, or Firm*—Jenkins & Gilchrist

(57) ABSTRACT

A radio unit casing (401) for a portable radio unit with an integrated antenna array capable of operating in a satellite communication mode. The antenna array comprises a number of adjacent co-operating antenna array surfaces arranged to be conformaly integrated in the radio unit casing (401). The antenna array surfaces faces in a multitude of directions which gives the antenna array a wide scan volume. The surfaces of the antenna array comprise a number of interleaved transmit and receive antenna elements, e.g. circular formed patches, in multiplayer structure.

20 Claims, 6 Drawing Sheets

Section A–A

Section B-B

RADIO UNIT CASING INCLUDING A HIGH-GAIN ANTENNA

TECHNICAL FIELD OF THE INVENTION

The present invention relates to a radio unit casing for a portable radio unit with a single high-gain antenna unit for transmitting and receiving radio signals within a wide scan range in a satellite communication system.

DESCRIPTION OF RELATED ART

The name portable radio unit includes all portable equipment intended for radio communication, like mobile phones, transceivers, pagers, telex, electronic notebooks and communicators. These equipments can be used in any type of radio communication system, such as cellular networks, satellite or small local networks.

One type of radio communication is cellular mobile communication where portable radio units communicate with each other or with fixed units through mobile basestations on the ground. Portable radio units, for example mobile phones, which typically transmit and receive signals at a frequency of approximately 900 Megahertz or 1800–1900 Megahertz (MHz), are well known.

Recently it has become important for another type of radio communication, i.e. satellite communication.

In the near future, we will foresee communications by satellites directly to portable radio units. The satellites can reach portable radio units in areas where cellular communication is unavailable due to the lack of necessary cellular towers, base stations or compatible standards. Such satellite communications could allocate to the 2 Gigaherz (GHz) band and the 20/30 GHz bands. Several systems with high data rates (64 kbps and 2 Mbps) are in the planning stage.

The satellites of the systems can be of different types such as GEO (Geostationary Earth Orbit), ICO (Intermediate Circular Orbit), LEO (Low Earth Orbits) or HEO (Highly Elliptical Orbit).

It is recognised that for cellular and satellite mode communication different types of antennas are necessary since cellular antennas usually are linearly polarised and satellite antennas usually are circularly polarised. A further difference is that the satellite communication mode involves a directional component, where link-margin is increased when the satellite antenna on the portable radio unit is pointed toward the satellite, and the cellular communication mode does not usually have such a directional component. Thus, the positioning of the satellite antenna in the portable radio unit is very important, as is the construction of the satellite antenna.

One example of a portable radio unit is a portable phone. Flip covers for portable phones have generally been used to protect the keypad or the display. In some applications, though, the flip cover has been utilised to house an antenna (e.g. U.S. Pat. Nos. 5,337,061, 5,542,106, 5,451,965).

The European patent application with publication number EP 752 735 describes an antenna system of several individual antennas attached to or integrated in a housing of a mobile telephone. The high frequency power emitted from each antenna is individually controllable. The antenna system measures the wave impedance for each antenna and steers the emitted power to those antennas which measures the impedance of free space propagation. The purpose of this antenna system is to avoid radiation on the head of the user. The antenna system also gives a receive diversity (not mentioned in the description or claimed).

The Japanese patent with publication number JP 56-168437 describes a portable radio device with two separate micro-strip antennas attached on a housing of the radio device. Both antennas are arranged on the same side of the radio device. One of these antennas can be used for both transmission and reception and the other antenna is only used for reception which entails reception diversity. The purpose of this patent is to eliminate the risk of breaking an antenna by attaching two microstrip antennas on the surface of the housing of the radio device.

The PCT patent application with publication number WO 95/04386 describes a composite antenna for hand held communications applications comprising at least two individual antennas. These antennas are spaced from each other at a specified distance.

As will be seen herein, each of the antennas disclosed in these patents is of a different construction than the radio unit casing with the satellite antenna of the present invention.

SUMMARY OF THE INVENTION

The present invention meets a number of problems related to antennas on portable radio units in satellite communication systems.

One problem is the integration of an antenna unit with transmit and receiving means in a casing where the area of the antenna unit has to be limited to the geometrical dimensions of the portable radio unit.

Another problem is to obtain a high antenna directivity in spite of the limited area available on a radio unit casing of a portable radio unit.

A further problem occurs when the portable radio unit is moved or turned in such a way that the angle between the beam direction pointing at the satellite and the aperture normal of the antenna unit becomes large. This requires that the antenna unit in the casing must be designed to have an antenna gain almost independent of the radio unit position.

Yet another problem occurs when the antenna in the portable radio unit has to scan a wide portion of the upper hemisphere to locate satellites. This requires that the scan volume for the transmit and receiving means has to be identical and that the scan range is wide.

A similar problem is that the antenna in the portable radio unit has to track the satellite with its transmit and receiving beams during movement of the satellite and/or the portable radio unit. This requires that the antenna in the portable radio unit must have the capability to both transmit and receive with beams pointing in substantially the same directions.

Another problem occurs when radio waves between the satellite and the portable radio unit are weak due to low output power from the satellite or the portable radio unit, or there is an attenuation in the radio wave propagation path between the satellites and the radio unit antenna. This requires higher radio unit antenna gain to achieve extra link margin.

Yet another problem is to avoid that the beam of the antenna unit is scattered by the user of the portable radio unit.

In light of the foregoing, a primary object of the present invention is to provide a radio unit casing with an integrated conformal antenna capable of operating in a satellite communication mode.

Another object of the present invention is to provide a radio unit casing with an integrated antenna that has a nearly constant gain in the whole scan range and the ability to search for and to track individual satellites.

Yet another object of the present invention is to provide a radio unit casing with an integrated antenna for a portable radio unit in which the transmitting and receiving means of the antenna unit shares the same aperture and scan volume.

Further objects of the present invention is to provide a radio unit casing for a portable radio unit with an integrated antenna unit, where said antenna unit has a scan range of at least half the upper hemisphere and a highly directional antenna radiating pattern with steerable transmit and receive beams.

Another object of the present invention is to obtain a widespread antenna aperture area which faces many directions in the radio unit casing to maintain a reasonable receive and transmit quality even at large scan angles.

Still another object of the present invention is to use the high gain and the beam control for satellite tracking in the radio unit to divert the beam from the antenna unit away from the user of the portable radio unit, to reduce powerless and avoid scattering.

A further object of the present invention is to obtain highest possible antenna gain within the constraints of the portable radio unit's geometrical dimensions to increase the margin in the link budget.

Another object of the present invention is to enable the antenna unit to establish a beam sufficiently sharp to select one of several satellites which can be viewed from the site of the portable radio unit.

In accordance with the present invention, a radio unit casing is disclosed in which a conformal antenna array is arranged in the radio unit casing.

More specifically, the antenna array comprises a number of adjacent antenna array surfaces with transmission and reception means which are arranged in the radio unit casing in such a way that the antenna array surfaces face in a multitude of directions. More than one of these antenna array surfaces are co-operating simultaneously to create a beam for transmitting or receiving radio signals. The antenna unit is conformal to the portable radio unit, has no movable parts and comprises interleaved antenna radiating elements, e.g. patches or slots, in a multi-layer structure.

Advantages with the present invention are that the beams of the antenna array are highly directional, they have a high terminal antenna transmit and receive gain and identical scan volumes. This entails that the portable radio unit can track individual satellites and establish a communication link.

Another advantage is that the antenna array in the radio unit casing faces more than one direction which entails an almost radio unit positioning independent antenna gain. This also entails a wide scan range in which a beam from the antenna array can scan for satellites in the upper hemisphere.

Other advantages are that the beams of the antenna unit avoids to be scattered by the user and that the antenna unit in the radio casing has no movable or protruding parts.

BRIEF DESCRIPTION OF THE DRAWINGS

These above mentioned objects and other features of the present invention will become more readily apparent upon reference to the following description when taken in conjunction with the accompanying drawings.

DETAILED DESCRIPTION OF EMBODIMENTS

Figure 1:
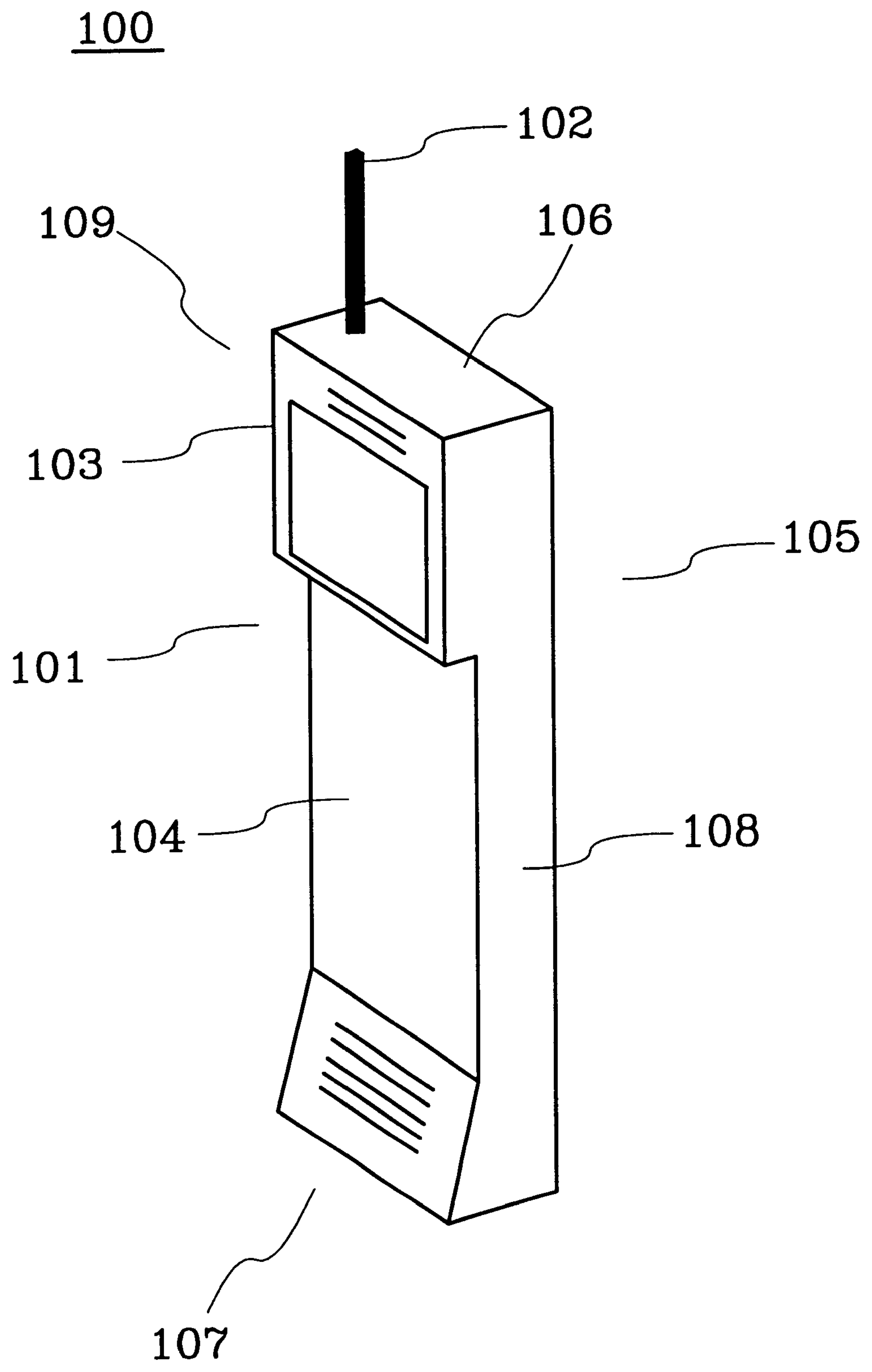
FIG. 1 is a perspective view of a common portable radio unit.

FIG. 1 is a perspective view of a portable radio unit 100 known in the art including a terminal unit 101 and a cellular mode antenna unit 102. The terminal unit 101 includes a radio unit casing 103 which encompasses the interior of the terminal unit 101. The radio unit casing 103 has a front and a back surface 104, 105 respectively. The radio unit casing 103 has also a top and bottom surface 106,107 respectively and a first and second side surface 108, 109 respectively. The back, bottom and second side surface 105, 107, 109 respectively are hidden in FIG. 1.

The terminal unit 101 with the radio unit casing 103 is illustrated as a mobile phone as an example in FIG. 1.

Other examples of terminal units with a radio unit casing 103 are transceivers, pagers, electronic notebooks and communicators.

Figure 2A:
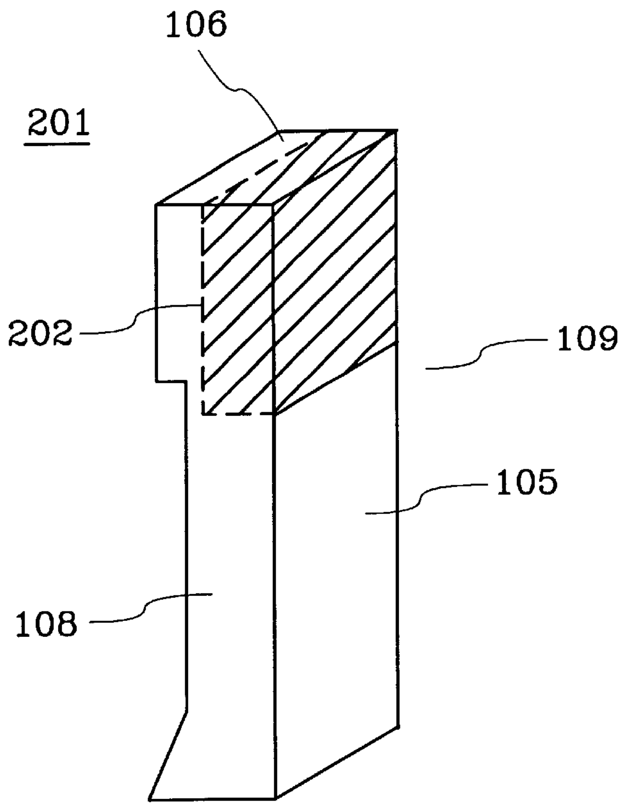
FIG. 2*a* is a perspective view of a first example of a first embodiment of a radio unit casing with an integrated antenna unit in accordance with the present invention.

FIG. 2*a* is a perspective view of a first example of a first embodiment of a radio unit casing 201 with a satellite antenna unit 202 according to the present invention. The satellite antenna unit 202 is integrated in the upper part of the radio unit casing 201 which is illustrated in FIG. 2*a* by the dashed areas of the radio unit casing 201.

The upper part of the radio unit casing 201 is the area which is close to the top surface 106 of the radio unit casing 201.

Figure 2B:
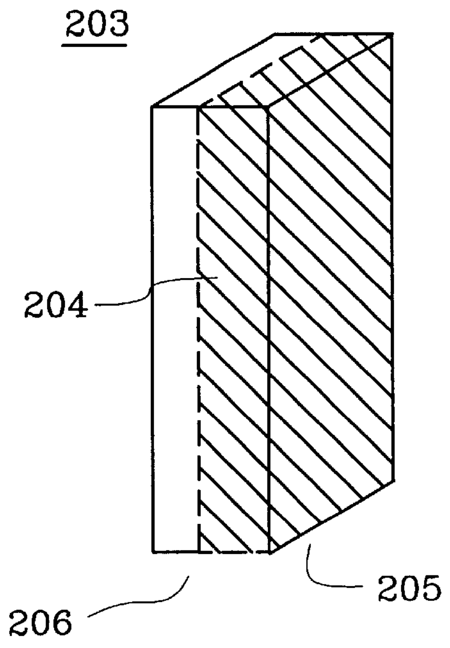
FIG. 2*b* is a perspective view of a second example of a first embodiment of a radio unit casing with an integrated antenna unit in accordance with the present invention.

FIG. 2*b* is a perspective view of a second example of a first embodiment of a radio unit casing 203, e.g. a transceiver casing, with a satellite antenna unit 204 according to the present invention. The satellite antenna unit 204 is integrated in a major part of the radio unit casing 203 which is illustrated in FIG. 2*b* by the dashed areas of the radio unit casing 203.

Figure 3:
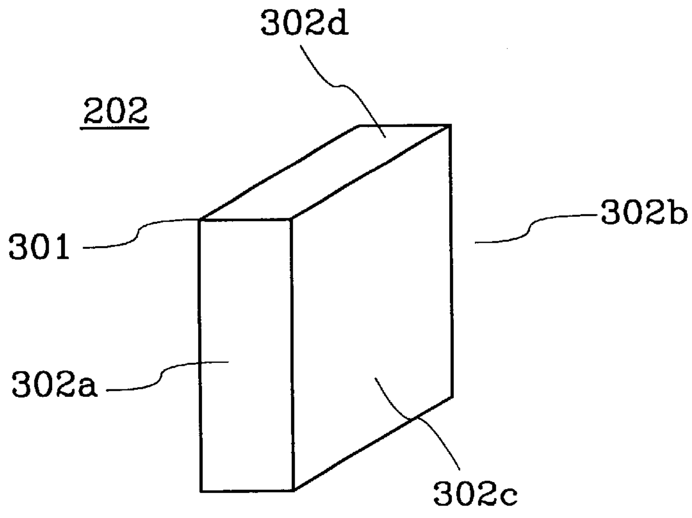
FIG. 3 is a perspective view of an antenna unit in accordance with FIG. 2*a*.

FIG. 3 illustrates the antenna unit 202 according to FIG. 2*a*. The antenna unit 202 comprises an antenna array 301

(phased array) with transmission and reception means which can electrically steer their radio beams by using known techniques.

An antenna array comprises individual antenna elements of similar type, normally regularly spaced on an antenna surface. Each individual antenna element is connected to beam forming networks in which the inter element phase shifts are set on predetermined values giving the required radiation patterns.

The antenna array 301 of the antenna unit 202 comprises a first, second, third and a fourth adjacent antenna array surface 302*a–d* respectively with transmission and reception means, where surface 302*b* is hidden in FIG. 3. These antenna array surfaces 302*a–d* respectively are rectangular shaped and arranged like a box without a lid and one side surface and integrated in the upper part of the radio unit casing 201, see FIG. 2*a*.

The first antenna array surface 302*a* is integrated in a part of the first side surface 108 of the antenna unit casing 201, close to the back and top surface 105,106 respectively.

The second antenna array surface 302*b* is integrated in a part of the second side surface 109 of the radio unit casing 201 close to the back and top surface 105,106 respectively and opposite to the first antenna array surface 302*a*. The second side surface 109 is hidden in FIG. 2*a*.

The third antenna array surface 302*c* is integrated in a part of the back surface 105 of the radio unit casing 201 close to the top surface 106 and between the first and second antenna array surface 302*a–b* respectively.

The fourth antenna array surface 302*d* is integrated in a part of the top surface 106 of the radio unit casing 201 between the first and second antenna array surface 302*a–b* respectively and next to the third antenna array surface 302*c*.

This entails that the antenna array 301 comprises four co-operating adjacent antenna array surfaces 302*a–d* facing in four different directions, which gives the antenna unit a wide scan volume. Each one of the antenna array surfaces 302*a–d* can as an example have a first scan volume with a high gain and together create a wider scan volume than the first scan volume with a high gain. One example of a first scan volume is ±45 degrees relative a normal of an antenna array surface. One example of a wide scan volume is at least ±60 degrees relative a normal of an antenna array surface.

The transmission and reception means of at least two of these antenna array surfaces 302 are co-operating simultaneously to create beams for transmitting and receiving radio signals.

The satellite antenna unit 202 can as an alternative be arranged on the radio unit casing 201. This is not shown in any figure.

The satellite antenna unit 204 integrated in the radio unit casing 203 according to FIG. 2*b* is an enlarged version of the antenna unit 202 with an additional fifth antenna array surface 205. The antenna array surface 205 is arranged in a bottom surface 206 of the radio unit casing 203 so that the antenna unit 204 forms a box without a lid. The bottom surface 206 and the fifth antenna array surface 205 are hidden in FIG. 2*b*.

The satellite antenna unit 204 can as an alternative be arranged on the radio unit casing 203. This is not shown in any figure.

Figure 4A:
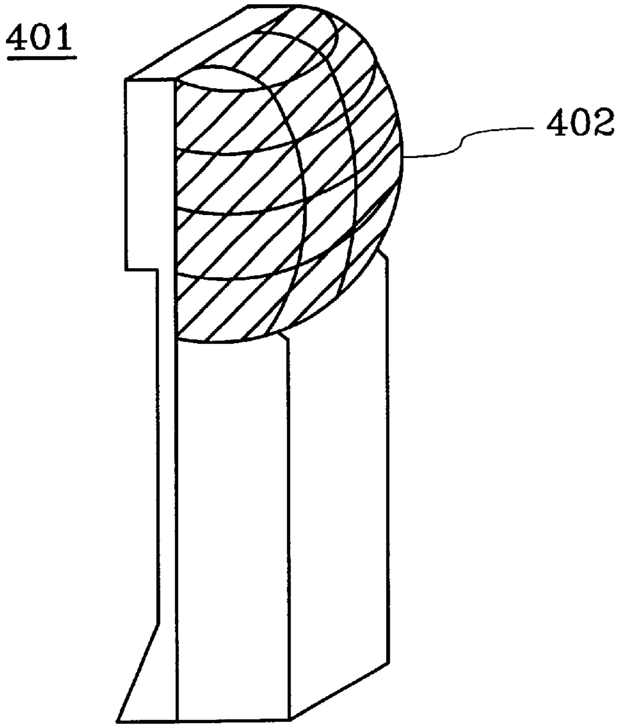
FIG. 4*a* is a perspective view of a first example of a second embodiment of a radio unit casing with an integrated antenna unit in accordance with the present invention.

FIG. 4*a* is a perspective view of a first example of a second embodiment of a radio unit casing 401 with a satellite antenna unit 402 according to the present invention. The satellite antenna unit 402 is integrated in the upper part of the radio unit casing 401 as in the first embodiment according to FIG. 2*a*.

The part of the radio unit casing 401 in which the antenna unit 402 is integrated is formed like a part of an ellipsoid which is illustrated in FIG. 4*a* by the dashed areas of the radio unit casing 401.

Figure 4B:
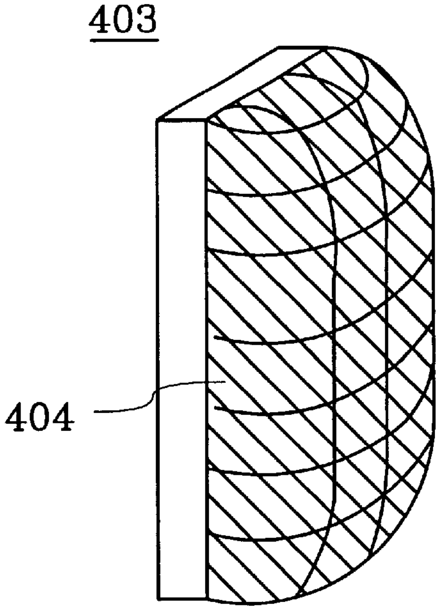
FIG. 4*b* is a perspective view of a second example of a second embodiment of a radio unit casing with an integrated antenna unit in accordance with the present invention.

FIG. 4*b* is a perspective view of a second example of a second embodiment of a radio unit casing 403, e.g. a transceiver casing, with a satellite antenna unit 404 according to the present invention. The satellite antenna unit 404 is integrated in a major part of the radio unit casing 403 which is illustrated in FIG. 4*b* by the dashed areas of the radio unit casing 403.

Figure 5:
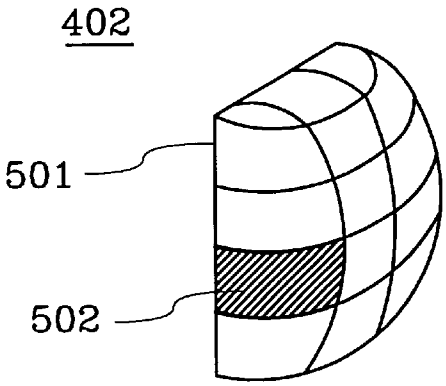
FIG. 5 is a perspective view of an antenna unit in accordance with FIG. 4*a*.

FIG. 5 illustrates the antenna unit 402 according to FIG. 4*a*. The antenna unit 401 comprises an antenna array 501 which can electrically steer its radio beams by using known techniques. The antenna array 501 comprises transmission and reception means on a number of adjacent and co-operating antenna array surfaces 502 arranged like a part of an ellipsoid to be conformaly integrated in the partly ellipsoid shaped upper part of the radio unit casing 401. This entails that the antenna array 501 faces in a multitude of directions which gives the antenna unit a wide scan volume. Each one of the antenna array surfaces 502 can as an example have a first scan volume with a high gain and together create a wider scan volume than the first scan volume with a high gain as in the first embodiment.

The adjacent antenna array surfaces 502 arranged like a part of an ellipsoid can be arranged in such a way that the antenna array 501 forms a smooth curved surface or a faceted surface. Transmission and reception means of more than one of these antenna array surfaces 502 are co-operating simultaneously to create beams for transmitting and receiving radio signals.

The adjacent antenna array surfaces 502 can e.g. be of a rectangular, triangular, pentagonal or hexagonal shape.

The satellite antenna unit 402 can as an alternative be arranged on the radio unit casing 401. This is not shown in any figure.

The satellite antenna unit 404 integrated in the radio unit casing 403 according to FIG. 4*b* is an enlarged version of the antenna unit 402.

The satellite antenna unit 404 can as an alternative be arranged on the radio unit casing 403. This is not shown in any figure.

The transmission and reception means of the antenna arrays 301 and 501 comprises a number of antenna elements, e.g. patches or slots, to receive and transmit circularly polarised radio signals.

The patches in the antenna arrays 301 and 501 can as an example be rectangular or circular in shape and the slots can as an example be shaped like a cross. The patches and slots can as an example be placed in a rectangular, circular, hexagonal or triangular grid. The size and number of transmit and receive patches/slots on the antenna arrays 301 and 501 differ due to different frequencies in the received and transmitted radio signals.

FIGS. 6*a–10* illustrates a number of examples where the patches and slots for transmitting and receiving radio signals are interleaved with each other and arranged in a periodically variable multi-layer structure. The periodicity is determined by the receive and transmit frequencies.

Figure 6A:
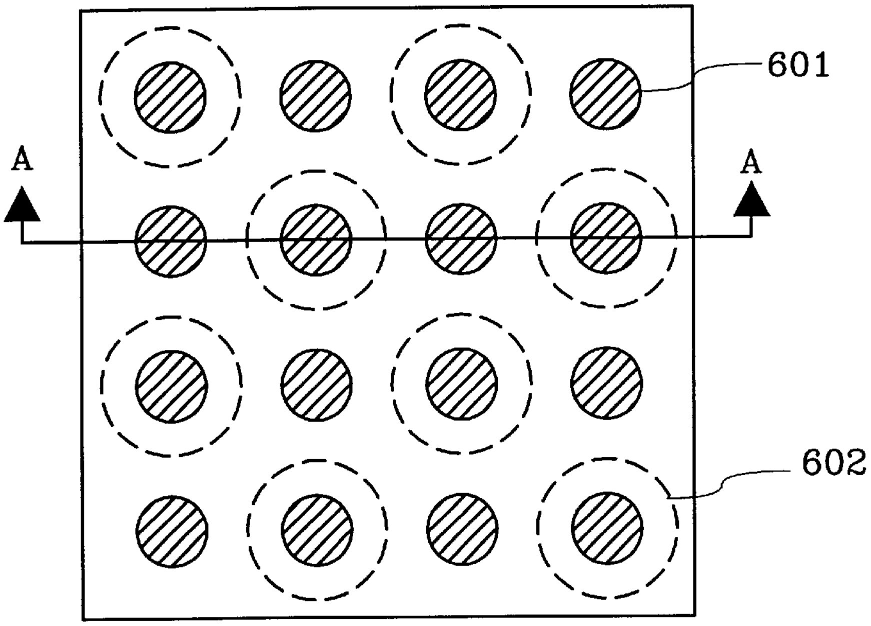
FIG. 6*a* is a first example of an antenna array with circular patches.
Figure 7:
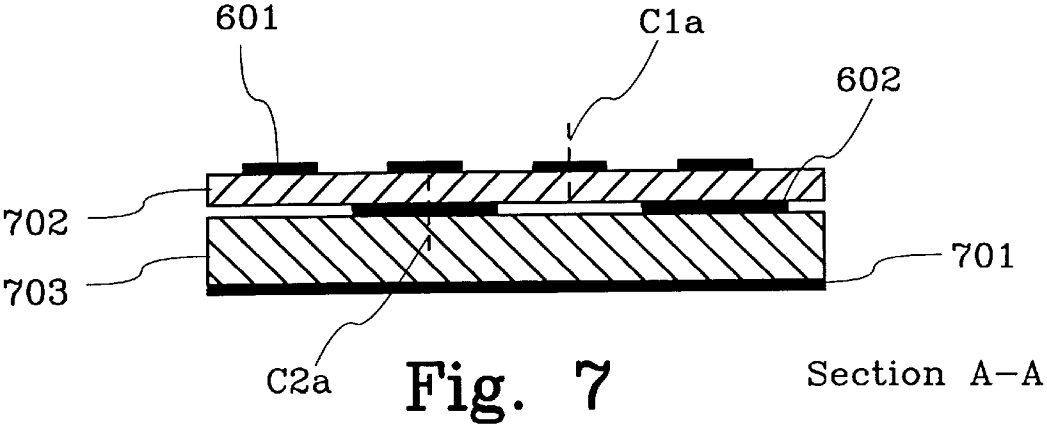
FIG. 7 is a cross-sectional view of the antenna array according to FIG. 6*a*.

FIG. 6*a* illustrates a first example of how the antenna arrays 301, 501 respectively can be arranged with circular patches for transmitting 601 and receiving 602 in a first and second layer, see FIG. 7. The patches for receiving 602 are dashed to illustrate that they are in a different layer than the patches for transmitting 601.

The patches for transmitting 601 are smaller and are of a larger number than the patches for receiving 602 due to a higher frequency for the transmitted radio signals than the received radio signals.

The patches for receiving 602 can as an alternative be used for transmitting and the patches for transmitting 601 can be used for receiving if the received radio signals are of a higher frequency than the transmitted radio signals.

According to FIG. 7 which is a cross-section along line A—A, shown in FIG. 6*a* the patches for transmitting 601 are arranged in the first layer and the patches for receiving 602 are arranged in the second layer. Between the first and second layer is a first dielectrical volume 702 arranged. A ground plane 701 comprising an electrically conductive material is arranged in a third layer. Between the second and third layer is a second dielectrical volume 703 arranged.

Each of the patches for transmitting 601 has a first centre axis C1*a* which is extending perpendicular through said first, second and third layer. Each of the patches for receiving 602 has a second centre axis C2*a* which is extending perpendicular through said first, second and third layer.

Figure 6B:
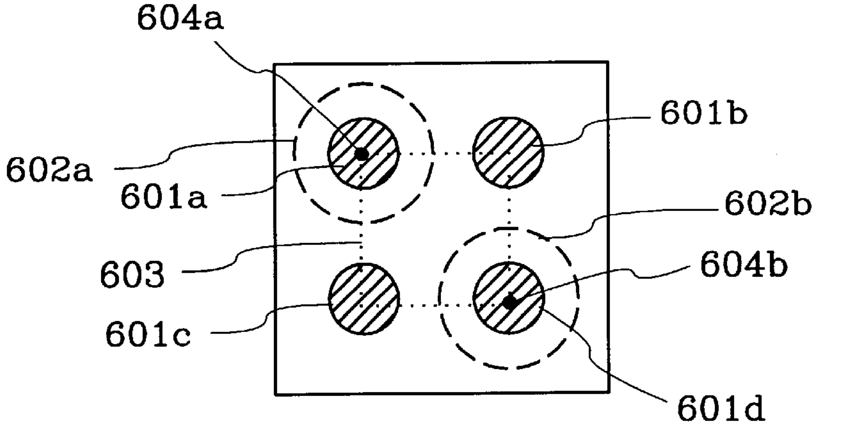
FIG. 6*b* is a first example of a pattern of patches in an antenna array.

The patches 601 and 602 are arranged in a periodical pattern in their respective layer. FIG. 6*b* shows a first example of such a pattern where 4 patches for transmitting 601*a–d* are arranged in a square 603, where each of their centre axes C1*a* are situated in the corners of the square 601. The square 601 is illustrated in the figure by a dotted line.

Patch 601*a* is diagonal arranged to patch 601*d*. A patch for receiving 602*a* is arranged in the second layer in such a way that the centre axis C2*a* of the patch 602*a* coincide with the centre axis C1*a* of the patch for transmitting 601*a*. A patch for receiving 602*b* is arranged in the second layer in such a way that the centre axis C2*a* of the patch 602*b* coincide with the centre axis C1*a* of the patch for transmitting 601*d*. The patch for receiving 602*a* forms a common antenna array node 604*a* with the patch for transmitting 601*a* and the patch for receiving 602*b* forms a common antenna array node 604*b* with the patch for transmitting 601*d*.

This pattern is repeated in the whole array as seen in FIG. 6*a*. This results that every other patch for transmitting 601 (a first number of patches) in the first layer forms a common antenna array node 604*a*, 604*b* respectively with a patch for receiving 602 in the second layer as seen in FIG. 7.

Figure 8A:
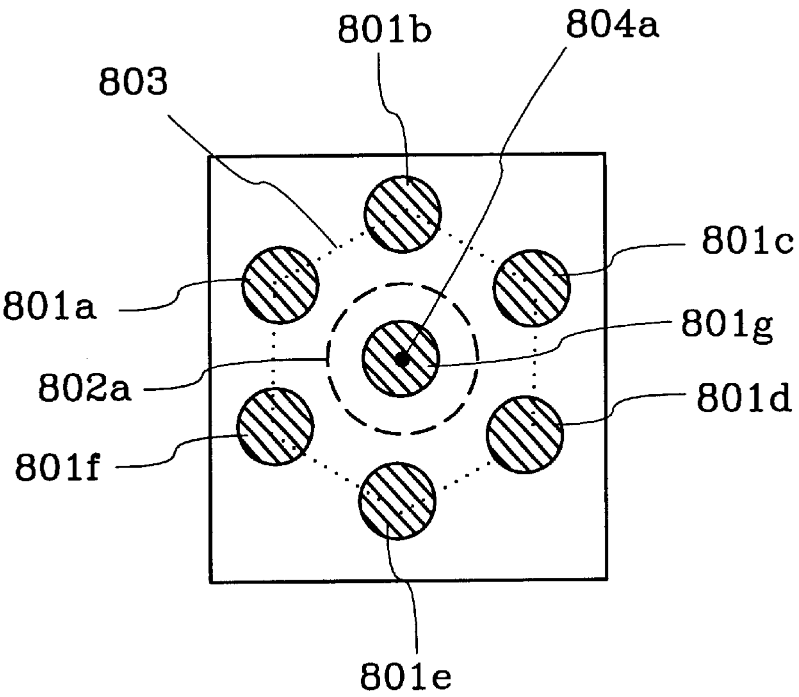
FIG. 8*a* is a second example of a pattern of patches in an antenna array.

FIG. 8*a* shows a second example of how the patches of the antenna arrays 301, 501 respectively can be arranged in a periodical pattern. The first layer has 6 patches for transmitting 801*a–f* arranged in a uniform hexagon 803 and one centre patch for transmitting 801*g* arranged in the middle of the hexagon 803.

A patch for receiving 802*a* is arranged in the second layer in such a way that the centre axis C2*a* of the patch 802*a* coincides with the centre axis C1*a* of the centre patch for transmitting 801*g*. The patch for receiving 802*a* forms a common antenna array node 804*a* with the centre patch for transmitting 801*a*.

Figure 8B:
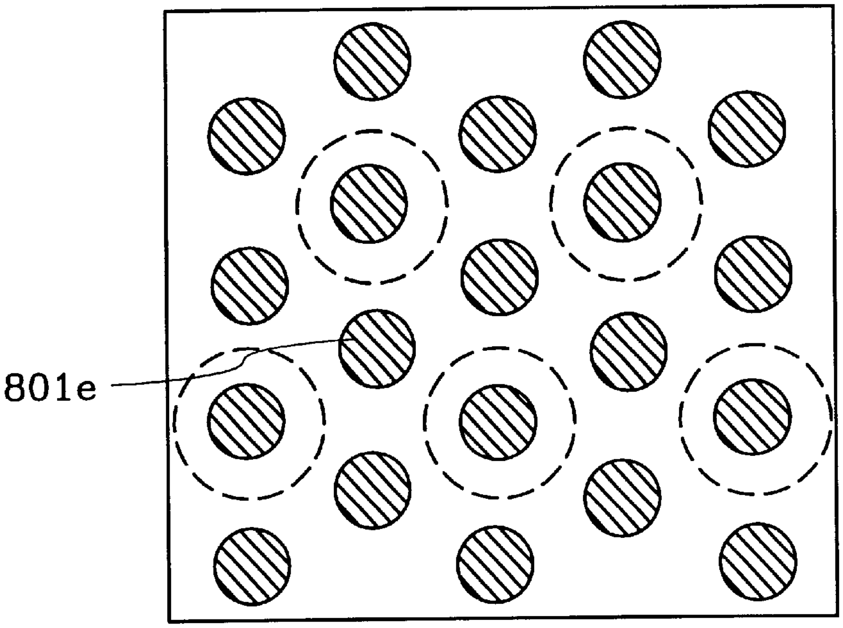
FIG. 8*b* is a second example of an antenna array with circular patches.

This pattern is repeated in the whole array in such a way that three adjacent hexagons of patches for transmitting have one patch in common, see patch 801*e* in FIG. 8*b*.

Figure 9A:
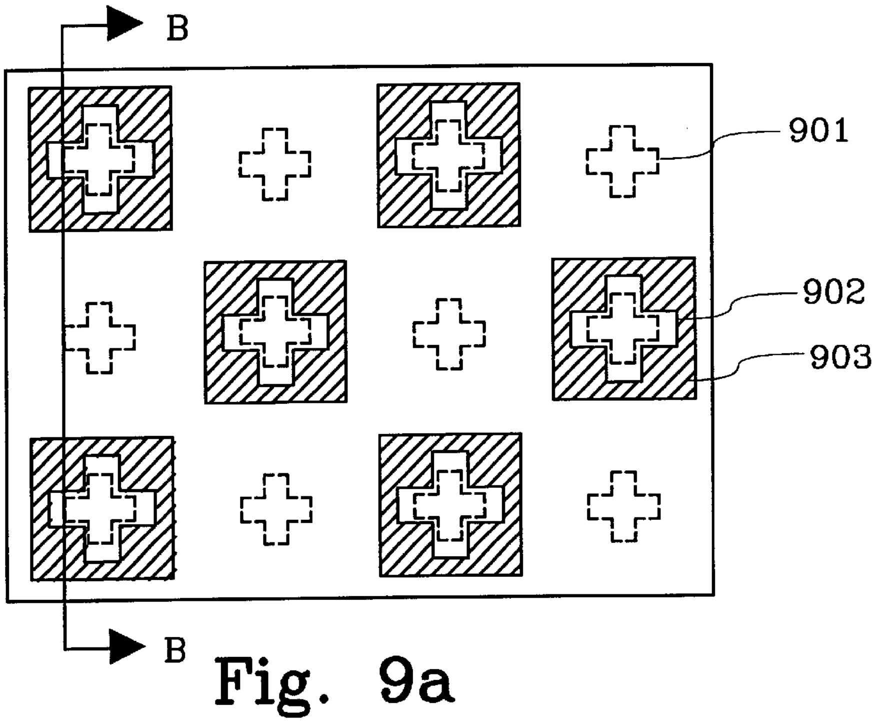
FIG. 9*a* is an example of an antenna array with slots.

FIG. 9*a* illustrates an example of how the antenna arrays 301, 501 respectively can be arranged with cross formed slots for receiving 902 and transmitting 901 in a first and second layer, see FIG. 7. The cross formed slots for transmitting 901 are dashed in FIG. 9*a* to illustrate that they are in a different layer than the slots for receiving 902.

Each cross formed slot for receiving 902 is arranged in the centre of a rectangular formed volume 903 of an electrically conductive material.

The slots for transmitting 901 are smaller and of a larger number than the slots for receiving 902 due to a higher frequency for the transmitted radio signals than the received radio signals.

The slots for receiving 902 can as an alternative be used for transmitting and the slots for transmitting 901 can be used for receiving if the received radio signals are of a higher frequency than the transmitted radio signals.

Figure 10:
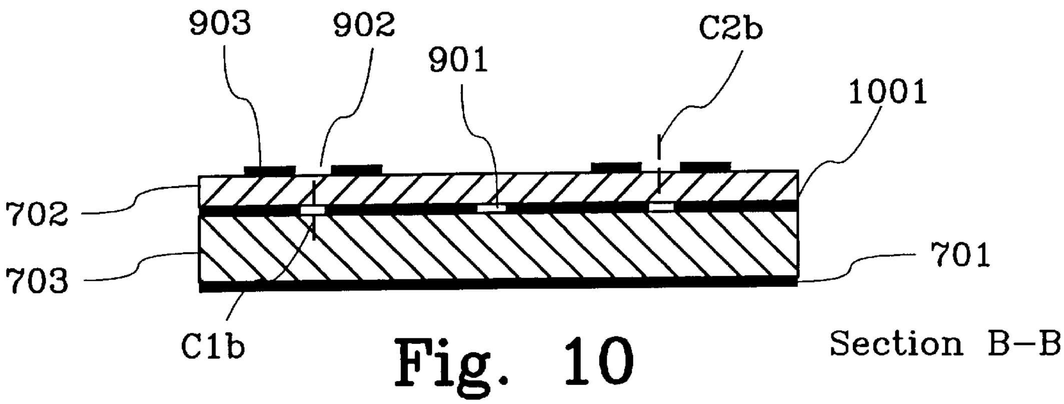
FIG. 10 is a cross-sectional view of the antenna array according to FIG. 9*a*.

According to FIG. 10 which is a cross-section along line B—B, shown in FIG. 9*a* the slots for receiving 902 are arranged in the first layer and the slots for transmitting 901 are arranged in an electrically conductive volume 1001 in the second layer. Between the first and second layer is the first dielectrical volume 702 arranged. The earth plane 701 comprising an electrically conductive material is arranged in the third layer. Between the second and third layer is the second dielectrical volume 703 arranged.

Each of the slots for transmitting 901 has a first centre axis C1*b* which is extending perpendicular through said first, second and third layer. Each of the slots for receiving 902 has a second centre axis C2*b* which is extending perpendicular through said first, second and third layer.

Figure 9B:
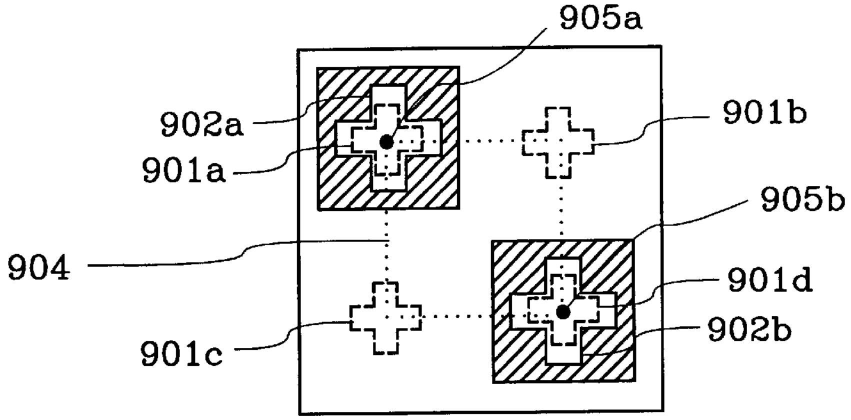
FIG. 9*b* is an example of a pattern of slots in an antenna array.

The slots 901 and 902 are arranged in a periodical pattern in their respective layer. FIG. 9*b* shows an example of such a pattern where 4 slots for transmitting 901*a*–d are arranged in a square 904 in the second layer, where each of their centre axes C1*b* are situated in the corners of the square 904. The square is illustrated in the figure by a dotted line.

Slot 901*a* is diagonal arranged to slot 901*d*. A slot for receiving 902*a* is arranged in the first layer in such a way that the centre axis C2*b* of the slot 902*a* coincide with the centre axis C1*b* of slot 901*a* in the first layer. A slot for receiving 902*b* is arranged in the first layer in such a way that the centre axis C2*b* of the slot 902*b* coincide with the centre axis C1*b* of slot 901*d* in the first layer. The slot for receiving 902*a* forms a common antenna array node 905*a* with the slot for transmitting 901*a* and the slot for receiving 902*b* forms a common antenna array node 905*b* with the slot for transmitting 901*d*.

This pattern is repeated in the whole array as seen in FIG. 9*a*. This results in that every other slot for transmitting 901 (a first number of slots) in the second layer forms a common antenna array node 905*a*, 905*b* respectively with a slot for receiving 902 in the first layer as seen in FIG. 10.

The size and the distances between the patches and slots in FIGS. 6*a*–10 is determined by the transmit and receive frequencies in a known way.

The antenna arrays 301 and 501 also comprise beamforming networks, not shown in any figure, connected to each individual antenna element, e.g. slot or patch, in a known way.

The antenna arrays 301 and 501 can as an example be used for frequencies above 10 GHz.

What is claimed is:

1. A radio unit casing for a portable radio unit, said radio unit casing including a plurality of radio unit casing surfaces and further including a single high-gain antenna unit for transmitting and receiving radio signals from/to said radio unit, said single antenna unit comprising:

an antenna array having at least three adjacent antenna array surfaces which face in different directions and which conform to at least portions of at least three of said plurality of radio unit casing surfaces; and means for receiving and transmitting radio signals to/from said antenna array surfaces.

2. The radio unit casing, as recited in claim 1, wherein said antenna unit is integrated in said radio unit casing.

3. The radio unit casing, as claimed in claim 1, wherein said antenna unit is arranged on said radio unit casing.

4. The radio unit casing, as recited in claim 1, wherein said receiving and transmitting means comprises:

a plurality of receiving patches for receiving;

a plurality of transmitting patches for transmitting; and a ground plane wherein said receiving patches, said transmitting patches and said ground plane form a multi-layer structure.

5. The radio unit casing, as recited in claim 4, wherein said plurality of receiving patches and said plurality of transmitting patches are interleaved with each other.

6. The radio unit casing, as recited in claim 5, wherein said receiving patches and said transmitting patches are arranged in a periodically variable multi-layer structure, and further wherein a subset of said transmitting patches form common antenna array nodes with said receiving patches.

7. The radio unit casing, as recited in claim 1, wherein said receiving and transmitting means comprises:

a plurality of receiving slots for receiving;

a plurality of transmitting slots for transmitting; and a ground plane wherein said plurality of receiving slots, said plurality of transmitting slots and said ground plane are arranged in a multi-layer structure.

8. The radio unit casing, as recited in claim 7, wherein said receiving slots and said transmitting slots are interleaved with each other.

9. The radio unit casing, as recited in claim 8, wherein said receiving slots and said transmitting slots are arranged in a periodically variable multi-layer structure, wherein a subset of said transmitting slots form common antenna array nodes with said receiving slots.

10. The radio unit casing, as recited in claim 1, wherein said antenna array includes surfaces which conform to at least portions of a top surface, a back surface and opposed side surfaces of said radio unit casing.

11. The radio unit casing, as recited in claim 1 wherein said portable radio unit comprises a portable phone.

12. A radio unit casing for a radio unit, said radio unit casing including a plurality of radio unit casing surfaces and further including a single high-gain antenna unit for transmitting and receiving radio signals from/to said radio unit, said single antenna unit comprising:

an antenna array having at least three adjacent antenna array surfaces which face in different directions and which conform to at least portions of at least three of said plurality of radio unit casing surfaces; and means for receiving and transmitting radio signals to/from said antenna array surfaces, wherein said means for receiving and transmitting radio signals to/from each of said antenna array surfaces co-operate to create antenna beams for receiving and transmitting within substantially equal scan volumes, and wherein said antenna unit is for satellite communications in a satellite communication system and said antenna beams point in substantially equal directions.

13. A radio unit casing for a radio unit, said radio unit casing including a plurality of radio unit casing surfaces and further including a single high-gain antenna unit for transmitting and receiving radio signals from/to said radio unit, said single antenna unit comprising:

an antenna array having at least three adjacent antenna array surfaces which face in different directions and which conform to at least portions of at least three of said plurality of radio unit casing surfaces; and means for receiving and transmitting radio signals to/from said antenna array surfaces, wherein said means for receiving and transmitting radio signals to/from each of said antenna array surfaces co-operate to create antenna beams for receiving and transmitting within substantially equal scan volumes, and wherein said receiving and transmitting means receives and transmits circularly polarized radio signals.

14. A radio unit casing for a radio unit, said radio unit casing including a plurality of radio unit casing surfaces and further including a single high-gain antenna unit for transmitting and receiving radio signals from/to said radio unit, said single antenna unit comprising:

an antenna array having at least three adjacent antenna array surfaces which face in different directions and which conform to at least portions of at least three of said plurality of radio unit casing surfaces; and means for receiving and transmitting radio signals to/from said antenna array surfaces, wherein said means for receiving and transmitting radio signals to/from each of said antenna array surfaces co-operate to create antenna beams for receiving and transmitting within substantially equal scan volumes, and wherein said receiving and transmitting means effectuates a scan range of at least a half of an upper hemisphere.

15. A radio unit casing for a radio unit, said radio unit casing including a plurality of radio unit casing surfaces and further including a single high-gain antenna unit for transmitting and receiving radio signals from/to said radio unit, said single antenna unit comprising:

an antenna array having at least three adjacent antenna array surfaces which face in different directions and which conform to at least portions of at least three of said plurality of radio unit casing surfaces; and means for receiving and transmitting radio signals to/from said antenna array surfaces, wherein said means for receiving and transmitting radio signals to/from each of said antenna array surfaces co-operate to create antenna beams for receiving and transmitting within substantially equal scan volumes, and wherein said at least three adjacent antenna array surfaces forms a portion of an ellipsoid.

16. The radio unit casing, as recited in claim 15, wherein said at least three adjacent antenna array surfaces are arranged such that said antenna array forms a smooth curved surface.

17. The radio unit casing, as recited in claim 15, wherein said at least three adjacent antenna array surfaces are arranged such that said antenna array forms a faceted surface.

18. A radio unit casing for a radio unit, said radio unit casing including a plurality of radio unit casing surfaces and further including a single high-gain antenna unit for transmitting and receiving radio signals from/to said radio unit, said single antenna unit comprising:

an antenna array having at least three adjacent antenna array surfaces which face in different directions and which conform to at least portions of at least three of said plurality of radio unit casing surfaces; and means for receiving and transmitting radio signals to/from said antenna array surfaces, wherein said antenna array includes surfaces which conform to at least portions of a top surface wherein said means for receiving and transmitting radio signals to/from each of said antenna array surfaces co-operate to create antenna beams for receiving and transmitting within substantially equal scan volumes, a back surface and opposed side surfaces of said radio unit casing, and wherein said antenna array surfaces further include an antenna array surface which conforms to at least a portion of a bottom surface of said radio unit casing.

19. The radio unit casing, as recited in claim 18, wherein said radio unit comprises a portable radio unit.

20. The radio unit casing, as recited in claim 19, wherein said portable radio unit comprises a portable phone.

* * * * *